United States Patent [19]

Kurosaki

[11] 4,158,981

[45] Jun. 26, 1979

[54] DRUM HOLDER

[75] Inventor: Makoto Kurosaki, Hamamatsu, Japan

[73] Assignee: Nippon Gakki Seizo Kabushiki Kaisha, Japan

[21] Appl. No.: 823,400

[22] Filed: Aug. 9, 1977

[30] Foreign Application Priority Data

Aug. 12, 1976 [JP] Japan .......................... 51/107029[U]

[51] Int. Cl.² .......................................... G10D 13/02
[52] U.S. Cl. ...................................................... 84/421
[58] Field of Search .......................................... 84/421

[56] References Cited

U.S. PATENT DOCUMENTS

| 892,105 | 6/1908 | White | 84/421 |
|---|---|---|---|
| 3,405,587 | 10/1968 | Meazzi | 84/421 |
| 3,535,976 | 10/1970 | Osuga | 84/421 |
| 3,576,149 | 4/1971 | Slingerland | 84/421 |

*Primary Examiner*—L. T. Hix
*Assistant Examiner*—S. D. Schreyer
*Attorney, Agent, or Firm*—Ostrolenk, Faber, Gerb & Soffen

[57] ABSTRACT

A drum holder utilizing a universally angularly turnable ball joint mechanism is provided with a spherical member mounted atop a stand, a housing lockable accommodating the spherical member, and an elongated rod extending from the housing along which a block for holding drums is slidable. Uniform locking of the ball joint eliminates damage on the spherical member while excellently avoiding undesirable slippage in the ball joint and provision of the slide mechanism enables easy horizontal displacement of the drums with the stand being left stationarily on the floor.

21 Claims, 6 Drawing Figures

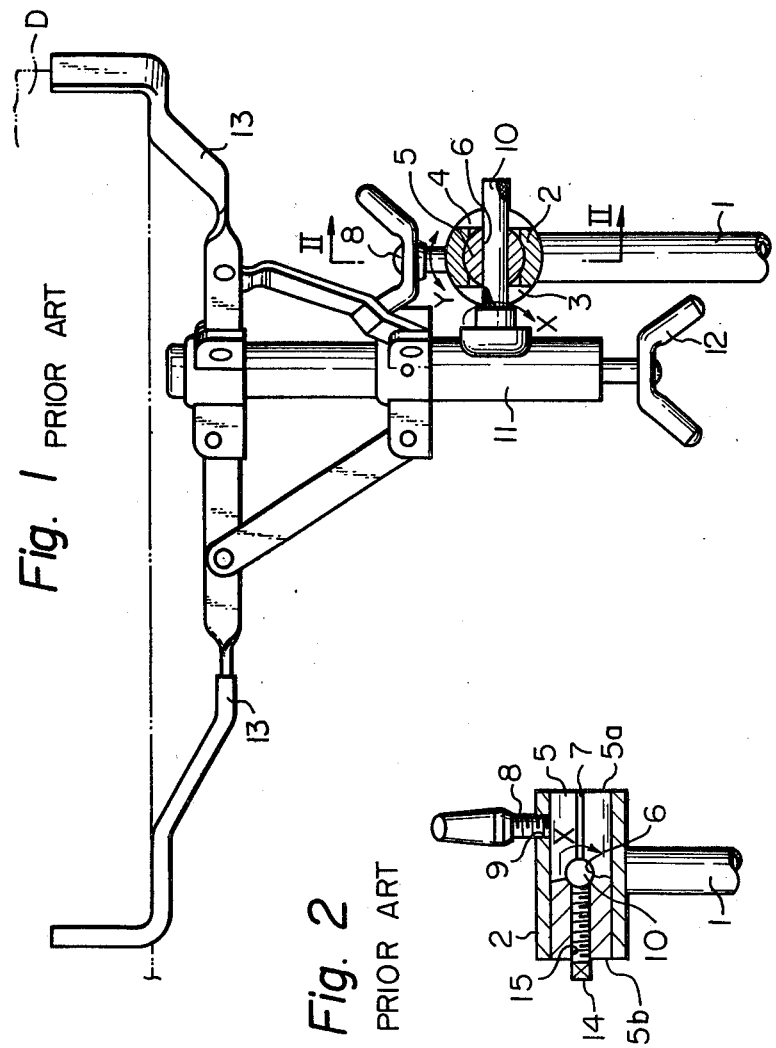

DRUM HOLDER

BACKGROUND OF THE INVENTION

The present invention relates to an improved drum holder, and more particularly relates to an improved construction of a drum holder preferably usable for holding snare drums and utilizing a universally angularly turnable ball joint formed of a spherical member mounted atop a stand and a housing for accommodating the spherical member.

In the case of drums, particularly drums such as snare drums, the angular postures to be assumed by the drums very considerably from player to player being particularly influenced by personal preference of the player using the drums.

In order to enable the drums to assume such various angular postures, the conventional drum holder is provided with an angularly turnable joint mechanism which is comprised of a pair of axially turnable rod members. The first rod is mounted atop a stand, which is placed on the floor, in an axially turnable disposition. The second rod is coupled to the first rod in an axially turnable disposition. The second rod holds the drum via interconnecting members. Combined axial turnings of the above-described two rods enables the drum to assume the angular posture required by the player.

When it is required to displace the drum held by the above-described conventional drum holder substantially a horizontal direction towards and away from the position of the player, it is necessary to move the stand together with the drum holder as the first rod is fixed to the stand and the drum is in immovable relationship to the stand via the first and second rods though angularly turnable.

In practical play of drums, a number of various drums such as bass drums and snare drums are arranged very close to each other around the player's station. So, it is very difficult and troublesome in practice to displace a drum holder together with the stand while threading its way through a crowd of standing drums.

In addition, the extent of the axial turning of the first rod is somewhat limited as the second rod coupled thereto abuts a member mounting the first rod to the stand upon axial turning of the first rod exceeding a certain extent. Thus, there is some limit to the angular posture to be assumed by the drums held by the conventional drum holder.

SUMMARY OF THE INVENTION

The principal object of the present invention is to provide a drum holder which enables horizontal displacement of drums held thereby without need for moving the stand to which the drum holder is mounted.

Another object of the present invention is to provide a drum holder which enables drums held thereby to assume any universal angular posture.

In accordance with one aspect of the present invention a spherical member fixed atop a stand to be placed on the floor is accommodated at least partly within a housing in an angularly turnable disposition, the spherical member and the housing forming a ball joint, and the housing being internally provided with elongated projections encroachable upon the spherical member when the latter is locked within the housing against free angular turning. Means for mounting drums to the drum holder via interconnecting members is attached to the housing.

In accordance with another aspect of the present invention, an elongated rod preferably having a polygonal transverse cross section extends from a housing accommodating a sperical member disposed atop a stand, both forming a ball joint. A mounting block holding drums via interconnecting arms is inserted over the elongated rod in a slidable disposition along the length of the elongated rod. Means for locking the mounting block against free sliding is attached to the mounting block.

In accordance with the other object of the present invention, a spherical member fixed atop a stand to be placed on the floor is accommodated at least partly within a housing in an angularly turnable dispostion, the spherical member and the housing forming a ball joint, and the housing internally provided with elongated projections encroachable upon the spherical member when the latter is locked within the housing against free angular turning. An elongated rod preferably having a polygonal transverse cross section extends from the housing and a mounting block holding drums via interconnecting arms is inserted over the elongated rod in a slidable disposition along the length of the elongated rod. This mounting block is accompanied by means for locking same against free sliding.

BRIEF EXPLANATION OF THE DRAWINGS

FIG. 1 is a side view, partly in section, of an example of the conventional drum holder utilizing an angularly turnable joint mechanism, FIG. 2 is a section taken along the line II—II in FIG. 1.

DESCRIPTION OF THE PREFERRED EMBODIMENT

Figure 3:
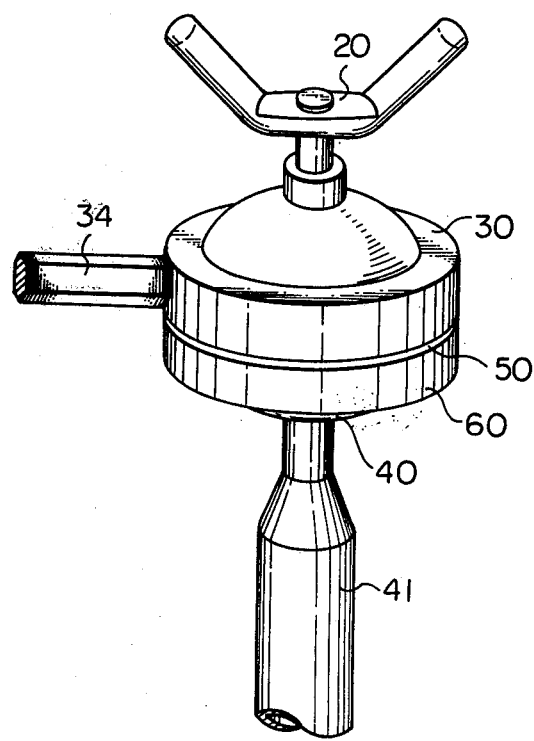
FIG. 3 is a perspective view of an embodiment of the drum holder in accordance with the present invention in the assembled state.

One popular example of the conventional drum holder incorporating the ball joint mechanism and preferably usable for holding snare drums is shown in FIGS. 1 and 2, in which a tubular stand 1 is supported in an upright disposition by a tripod (not shown) coupled to the bottom end thereof. A sleeve 2 is horizontally fixed atop the tubular stand 1 by, e.g. welding and a pair of substantially rectangular cutouts 3 and 4 are formed in opposite side surfaces of the sleeve 2. A locking member 5 having a circular cross transverse section is inserted into the sleeve 2 in an axially turnable disposition and is provided with a diametrical through hole 6 opening at both ends in the above-described cut-outs 3 and 4 of the sleeve 2. A slit 7 is formed traversing the locking member 5 while extending from one side of the diametrical through hole 1 to one longitudinal end 5a of the locking member 5.

A fastening bolt 8 is screwed into a threaded hole 9 formed diametrically through the sleeve 2 and the point of this fastening bolt 8 is in pressure contact with the periphery of the locking member 5 in order to fasten same as hereinafter explained in more detail. A carrier rod 10 of a circular transverse cross section is inserted in an axially turnable disposition into the diametrical through hole 6 of the locking member 5 while extending through the cut-outs 3 and 4 of the sleeve 2. This carrier rod 10 is provided with a mechanically roughened peripheral surface.

A tubular post 11 for supporting drums is fixed at the stem thereof to one end of the carrier rod 10 and accompanied at the top thereof by radially extending arms 13 for supporting a drum D placed thereon. The mounting disposition of the arm 13 on the post 11 can be changed as desired by manually operating an adjusting handle 12 mechanically coupled to the bottom end of the post 11. A fastening bolt 14 having an angled head is screwed into a threaded hole 15 extending from the other longitudinal end 5b of the locking member 5 to the other side of the diametrical through hole 6 in such an arrangement that the point of this fastening bolt 14 is in pressure contact with the periphery of the carrier rod 10 received in the through hole 6 in order to limit free axial turning of same.

In order to fix the selected posture of the drum D supported by the above-described drum holder, the drum D is placed on the arms 13 and fixed thereto by manually operating the adjusting handle 12. Next, the two fastening bolts 8 and 14 are loosened in order to enable axial twining of the locking member 5 in the sleeve 2 (arrow Y) and the carrier rod 10 in the locking member 5 (arrow x). By this combined axial turning of both elements 5 and 10, the posture of the arms 13 can be adjusted by a player.

After the drum D has assumed the selected posture, the fastening bolt 8 is tightened in order to depress one prong of the locking member 5 against the other, thereby firmly limiting free axial turning of the locking member. Concurrently with this, the carrier rod 10 is firmly clamped in the through hole 6 by the two prongs of the locking member 5, thereby limiting free axial turning of the carrier rod 10. This fastening of the carrier rod 10 is further strengthened by tightening the fastening bolt 14 whose point strongly presses the carrier rod 10.

The above-described conventional drum holder functions to some degree in order to set the drum held thereby to a selected posture, i.e., angular position. With this construction, however, when the drum such as a snare drum held by this drum holder should be brought close to or remote from its associated bass drum, it is necessary to move the drum holder together with the stand to which same is mounted. For actual play of a number of drums arranged together, the drums are in general arranged very close to each other. Thus, it is very troublesome in practice to move the drum holder together with the associated stand without undesirably disordering already established arrangement of other drums and their related parts. With this construction further, extent of the axial turning of the locking member 5 is limited to an ambit in which the carrier rod 10 should not contact the fringes of the sleeve 2 defining the side cut-outs 3 and 4. In other words, the posture that could be assumed by the drum 4 held by this conventional drum holder is very limited by the axially turnable ambit of the locking member 5 within the sleeve 2.

One embodiment of the drum holder in accordance with the present invention is shown in FIGS. 3 through 6.

Figure 4:
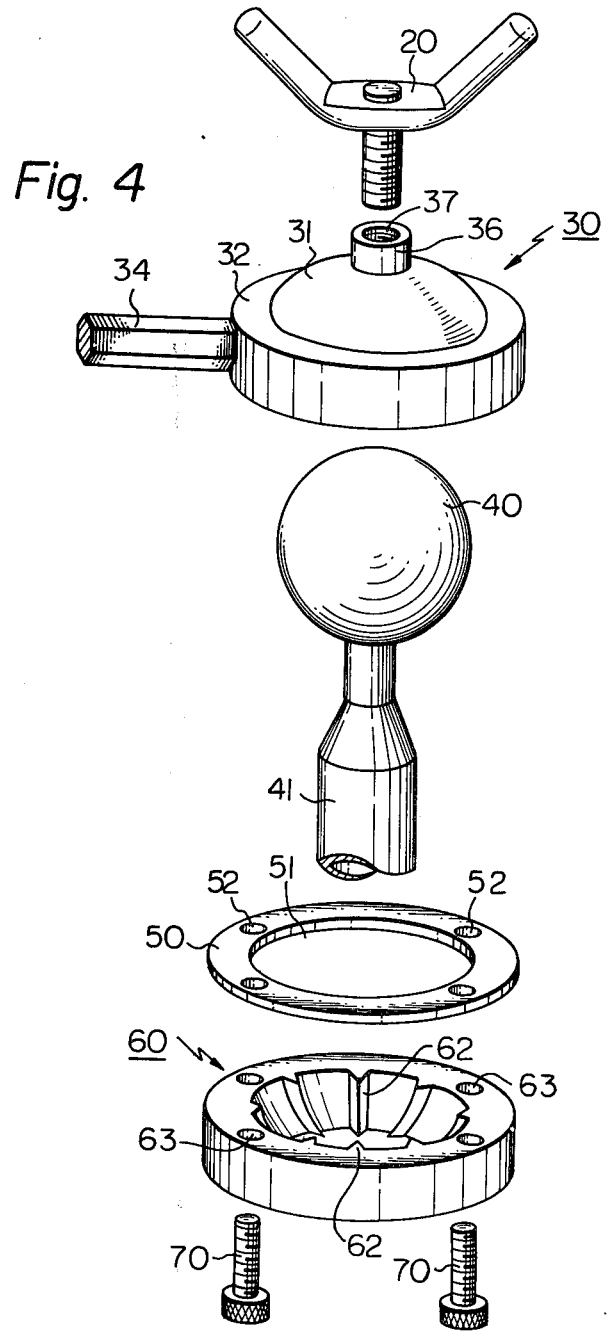
FIG. 4 is a perspective view of the drum holder shown in FIG. 3 in a disassembled state.

As best seen in FIG. 4, the drum holder of this invention includes, as major elements, a fastening bolt 20, a cup member 30, a spherical member 40, a packing 50, a socket 60 and fastening bolts 70.

Figure 6:
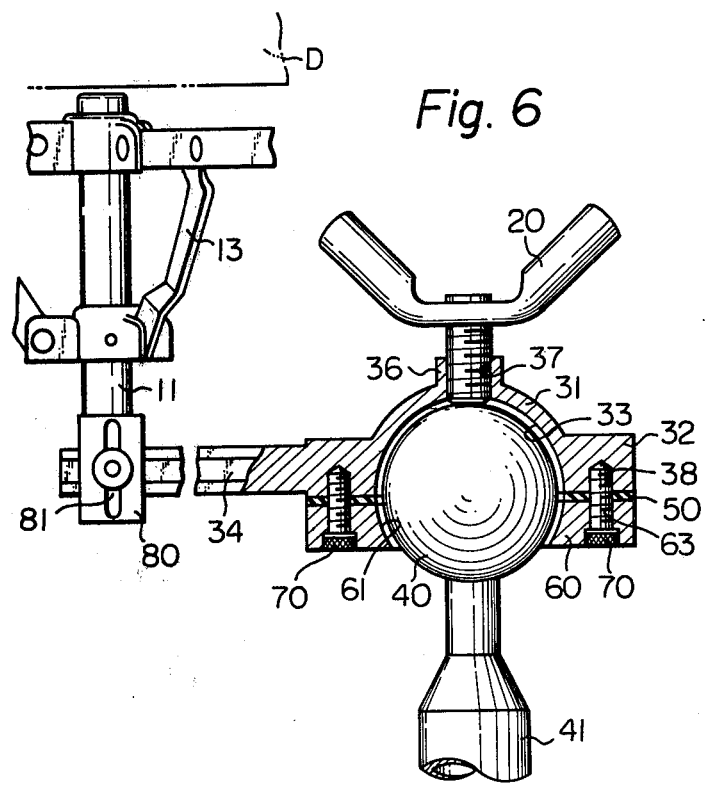
FIG. 6 is a side view, partly in section, of the drum assembly shown in FIGS. 3 and 4.

The cup member 30 preferably of a metallic material is comprised of a semi-spherical dome 31 and a flange 32 formed intergrally in one piece of the dome 31. As shown in FIG. 6, the dome 31 and the flange 32 internally defines a semi-spherical recess 33 to accomodate the spherical member 40 as hereinafter described. The flange 32 is provided with a radially extending rod 34 having a polygonal transverse cross section. The dome 31 has a projection 36 formed at the top thereof, in which a threaded hole 37 receptive of the fastening bolt 20 is formed and this threaded hole 37 internally opens in the recess 33 of the cup member 30. Again as shown in FIG. 6, the cup member 30 has two or more threaded holes 38 formed in the bottom surface thereof. Preferably, these threaded holes 38 should be distributed at equal circular intervals in order to assure overall uniform coupling of the cup member 30 with the socket 60.

The spherical member 40 is accompanied with a tubular stand 41 which corresponds to the tubular stand 1 used in the conventional drum holder shown in FIG. 1 and, likewise, is to be supported, desirably detachably, in an upright disposition by a tripod (not shown) coupled to the bottom thereof. The spherical member 40, at least the spherical outer surface thereof, is made of a synthetic resin material such as polycarbonate resin, nylon resin or ABS resin in order to assure better engagement with the later explained fastening bolt 20 of a metallic material.

The packing 50 is made of a resilient material such as rubber or resin. This packing 50 is provided with a center through hole 51 whose diameter should be larger than that of the spherical member 40. Surrounding this center through hole 51, are formed idle through holes 52 the number and interval of which are same as those of the threaded holes 38 formed in the bottom surface of the cup member 30. This packing 50 is preferably used for the purpose of establishing neat and stable coupling of the cup member 30 with the socket 60.

Figure 5:
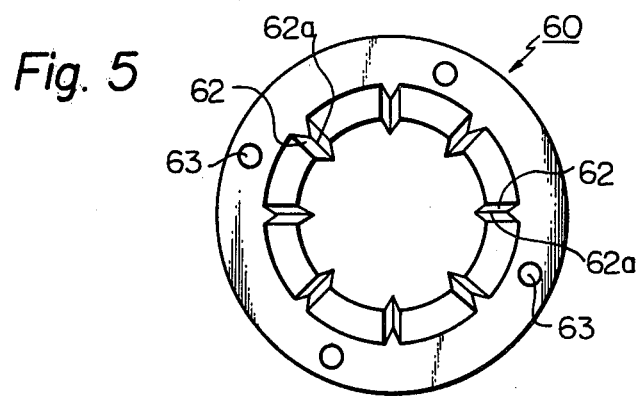
FIG. 5 is a plan view of a socket used in the drum holder shown in FIGS. 3 and 4.

The socket 60 preferably of a metallic material is provided with a substantially semi-spherical recess 61 opening in both axial ends thereof. This recess 61 converges from one end of the socket 60 to mate the packing 50 towards the other ends and the converging surface thereof is provided with a plurality of elongated projections 62 which run in the axial direction of the socket 60, each having a sharp edge 62a. As best seen in FIG. 5, the projections 62 should preferably be distributed on the converging surface of the above-described recess 61 substantially at equal intervals. The socket 60 is further provided with threaded holes 63 formed therethrough the number and interval of which are same as those of the threaded holes 38 formed in the bottom surface of the cup member 30.

It should be well understood that, in the assembled state of the cup member 30 with the socket 60 as shown in FIG. 5, a substantially spherical space defined by the wall of the recess 33 of the cup member 30 and the sharp edges 62a of the projections 62 of the socket 60 is adapted for accommodating the spherical member 40 therein. So, the radius of curvature of the above-described spherical space should be designed slightly larger than the radius of the spherical member 40.

In assembling the drum holder in accordance with the present invention, the cup member 30 is placed on the spherical member 40, the packing 50 is inserted over the spherical member 40 from the stand side, the socket 60 is attached to the cup member 30 sandwiching the packing 50 and encasing the spherical member 40 within its recess 61 and the fastening bolts 70 are screwed into the threaded holes 63 and 38 passing through the idle hole 52 of the packing 50 and fastened. Thus the spherical member 40 is accommodated within the above-described spherical space formed by the cup member 30 and the socket 60 in a freely angularly turnable disposition.

Next, the fastening bolt 20 is screwed into the threaded hole 37 of the cup member 30 until the point thereof comes into pressure contact with the surface of the spherical member 40. Thus, the spherical member 40 is locked against the free angular turning within the above-described spherical space. Finally, a mounting block 80 carrying the post 11 for holding the drum D is slidingly inserted over the rod 34 of the cup member 30 and, at the required position of the drum D, the block 80 is fixed to the rod 34 by a set screw 81.

In order to change the angular posture of the drum D, the fastening bolt 20 is loosened for enabling free angular turning of the cup member 30 and the socket 60 with respect to the spherical member 40 which is now held immovably by the tripod via the stand. As the cup member 30 turns, the rod 34 turns about the center of the spherical member 40 and the drum D assumes different angular posture. When the drum D is registered at the required angular posture, the fastening bolt 20 is screwed in until its point comes in pressure contact with the surface of the spherical member 40. Now, the cup member 30 with the socket 60 is locked against the spherical member 40 and the new angular posture of the drum D is fixed.

In order to change the horizontal position of the drum D, the set screw 81 is loosened, and slid along the rod 34 until the drum D is brought to the required horizontal position. After the registration is over, the set screw 81 is fastened to fix the drum D at the required horizontal position.

Although the elongated rod 34 extends from the cup member 30 in the illustrated embodiment, same may extend from the outer periphery of the socket 60 also.

As is clear from the foregoing description, the synthetic resin material forming the spherical member effectively hinders undesirable slippage between the spherical member and the members accommodating same, thereby reliably holding the drum at registered angular posture even when the drum is quite furiously battered. Especially use of polycarbonate resin for the spherical member excellently helps provide hard and nonslipping surface of the spherical member and absorb manufacturing error in dimension of the spherical member relating to its cooperating members. Presence of the sharp edges of the projections encroaching upon the lower half of the spherical member provides additional hindrance against undesirable slippage between the spherical member and its cooperating members. Especially, uniform distribution of the above-described projection edge encroachment over the entire lower half surface of the spherical member ideally assists the locking action by the top fastening bolt, thereby minimizing damages on the surface portion of the spherical member which comes in pressure contact with the fastening bolt point.

As the horizontal position of the drum can be freely changed by sliding the mounting block along the rod of the cup member, it is no longer necessary to move the stand together with the drum holder in order to change the horizontal position of the drum. The polygonal cross section of the rod effectively hinders undesirable turning of the block holding the drum about the axis of the rod while allowing longitudinal displacement of the block along the rod. These advantages are especially appreciated when the drum holder in accordance with the present invention is used for holding snare drums.

It should further be appreciated that there is no substantial limitation to the extent of axial turning of the cup member and the socket with respect to the spherical member. Thus, there is increased freedom in selection of the angular posture to be assumed by drums held by the drum holder in accordance with the present invention.

I claim:

1. An improved drum holder comprising, a first and a second member, wherein one of said members is for holding a drum;
   a spherical member fixed to one of said members and being rotatable with that said member around the axis of that said member, said spherical member having an outer surface made of a synthetic resin,
   a cup member having a substantially semi-spherical internal cup member recess for accommodating, at least partially, said spherical member, and said cup member being open at both axial ends thereof,
   a socket having an internal socket recess cooperating with and opening toward said cup member recess whereby said spherical member is accommodated in said cup member recess and said socket recess;
   a plurality of elongated projections formed on the wall that defines said internal socket recess, each said projection has a sharp edge to encroach upon said spherical member, each said projection is elongated in a direction substantially perpendicular to the direction in which said spherical member is rotatable with that one said member;
   means for detachably coupling said socket to said cup member in order to accommodate said spherical member in said recesses,
   means disposed to said cup member for releasably locking said spherical member within said internal cup member recess via pressure contact and also for driving said spherical member against said projections in said socket recess, and
   means for detachably mounting the other of said members, which is not fixed to said spherical member, to one of said cup member and said socket.

2. The improved drum holder as claimed in claim 1 in which said synthetic resin is chosen from a group composed of polycarbonate resin, nylon resin and ABS resin.

3. The improved drum holder as claimed in claim 1 in which said cup member comprises a dome and a flange formed integrally in one piece of said dome while internally defining said semi-spherical recess.

4. The improved drum holder as claimed in claim 1 in which said projections are distributed at substantially equal intervals around said socket recess.

5. The improved drum holder as claimed in claim 1 in which at least some of said projections extend in the axial direction of said socket and from one opening to the other opening of said recess of said socket.

6. The improved drum holder as claimed in claim 1 in which the radius of a spherical space defined by the wall of said semi-spherical recess of said cup member and said sharp edges of said projections of said socket is slightly larger than that of said spherical member.

7. The improved drum holder as claimed in claim 1 in which said detachably coupling means includes a plurality of fastening bolts screwed into threaded holes formed in said cup member and through said socket.

8. The improved drum holder as claimed in claim 1 in which said releasably locking means includes a fastening bolt screwed into a threaded hole formed through said cup member while opening in said semi-spherical recess.

9. The improved drum holder as claimed in claim 1 further comprising a packing inserted between said cup member and said socket.

10. An improved drum holder comprising,
 a first and a second member, wherein one of said members is for holding a drum;
 a spherical member to be fixed to one of said members and being rotatable with that said member around the axis of that said member, said spherical member having an outer surface made of a synthetic resin,
 a cup member having a substantially semi-spherical internal cup member recess for accommodating, at least partially, said spherical member, said cup member being open at both axial ends thereof,
 a socket having an internal socket recess cooperating with and opening toward said cup member recess for accommodating said spherical member within said cup member recess,
 a plurality of elongated projections formed on the wall defining said internal socket recess, each of said projections having a sharp edge to encroach upon said spherical member, each of said projections being elongated in a direction substantially perpendicular to the direction in which said spherical member is rotatable with that one said member,
 means for detachably coupling said socket to said cup member in order to accommodate said spherical member in said recesses,
 first means disposed to said cup member for releasably locking said spherical member within said internal recess of said cup member via pressure contact and also for driving said spherical member against said projections in said socket recess,
 means for detachably mounting the other one of said members, which is not fixed to said spherical member, to one of said cup member and said socket,
 a mounting block slidably mounted to said other one of said members and holding a drum, and
 second means for releasably locking said mounting block against free sliding along said other one of said members.

11. The improved drum holder as claimed in claim 10, in which said synthetic resin is chosen from a group composed of polycarbonate resin, nylon resin and ABS resin.

12. The improved drum holder as claimed in claim 10 in which said cup member comprises a dome and a flange formed internally defining a semi-spherical said recess.

13. The improved drum holder as claimed in claim 10 in which said projections are distributed at substantially equal intervals around said socket means.

14. The improved drum holder as claimed in claim 10 in which at least some of said projections extend from one to the other opening of said recess of said socket.

15. The improved drum holder as claimed in claim 10 in which the radius of a spherical space defined by the wall of said semi-spherical recess of said cup member and said sharp edges of said projections of said socket is slightly larger than that of said spherical member.

16. The improved drum holder as claimed in claim 10 in which said detachably coupling means includes a plurality of fastening bolts screwed into threaded holes formed in said cup member and through said socket.

17. The improved drum holder as claimed in claim 10 in which said first releasably locking means includes a fastening bolt screwed into a threaded hole formed through said cup member while opening in said semi-spherical recess.

18. The improved drum holder as claimed in claim 10 further comprising a packing inserted between said cup member and said socket.

19. The improved drum holder as claimed in claim 10 in which said means for detachably mounting comprises an elongated rod that extends in one axial direction of said spherical member.

20. The improved drum holder as claimed in claim 10 in which said elongated rod is provided with a polygonal transverse cross section.

21. The improved drum holder as claimed in claim 10 in which said second releasably locking means includes a set screw screwed into a threaded hole formed in said mounting block.

* * * * *